(12) United States Patent
Merrell et al.

(10) Patent No.: US 6,619,481 B2
(45) Date of Patent: *Sep. 16, 2003

(54) ARTICLE OF MANUFACTURE AND METHOD FOR PROTECTING INFORMATION-STORAGE DEVICES

(75) Inventors: Troy James Merrell, Longmont, CO (US); John Fredrick Hazekamp, Prior Lake, MN (US); Todd Allen Redder, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/771,000

(22) Filed: Jan. 25, 2001

(65) Prior Publication Data

US 2001/0006153 A1 Jul. 5, 2001

Related U.S. Application Data

(63) Continuation-in-part of application No. 09/341,699, filed on Jul. 27, 1999, now Pat. No. 6,220,442.
(60) Provisional application No. 60/139,914, filed on Jun. 17, 1999, and provisional application No. 60/139,699, filed on Jun. 17, 1999.

(51) Int. Cl.[7] .............................................. B65D 85/30
(52) U.S. Cl. .................................... 206/721; 206/521

(58) Field of Search .............................. 206/307, 521, 206/592, 588, 456, 719, 721; 220/4.23, 4.22, 4.21, 4.24, 671, 675, 837, 838, 839

(56) References Cited

U.S. PATENT DOCUMENTS

| | | | | |
|---|---|---|---|---|
| 5,046,659 A | * | 9/1991 | Warburton | 220/4.22 |
| 5,183,159 A | * | 2/1993 | Hojnacki et al. | 206/583 |
| 5,405,000 A | * | 4/1995 | Hagedon et al. | 206/216 |
| 5,518,120 A | * | 5/1996 | Ahlm et al. | 206/719 |
| 6,220,442 B1 | * | 4/2001 | Merrell et al. | 206/521 |

* cited by examiner

Primary Examiner—David T. Fidei
(74) Attorney, Agent, or Firm—Jennifer M. Buenzow (57) ABSTRACT

A means is provided for packaging disc drives and other information-storage devices in a manner that reduces transmittal of shock to the packaged device. The device is placed in a static-disssipative package comprising an upper and lower portion, each of which has external protrusions that deform to absorb shock. Further anti-impact protection is provided by internal buttresses that cushion the packaged device. The package is preferably a unitary article molded from PVC plastic sheeting, with the upper and lower portions joined at an accordion-like hinge. The upper and lower portions nest together at the peripheral edges, providing a labyrinthine path (in effect, a seal) that prevents passage of contaminants. Shock transmittal (relative to an unprotected drive) is reduced by a factor of approximately 5-7.

19 Claims, 9 Drawing Sheets

ARTICLE OF MANUFACTURE AND METHOD FOR PROTECTING INFORMATION-STORAGE DEVICES

This is a continuation in part of U.S. Pat. App. Ser. No. 09/341,699, having a priority date of Jul. 27, 1999, now U.S. Pat. No. 6,220,442, based on the filing date of Provisional Application 60/139,914 (filed Jun. 17, 1999) and claims the benefit of provisional application No. 60/139,699 filed Jun. 17, 1999, the benefit of which is claimed herein.

BACKGROUND

The field of this invention is protective packaging for disc drives and other information-storage devices. More specifically, the invention concerns a method and device for protecting disc drives and other information-storage devices from damage resulting from impact and electrostatic discharge during shipment and other non-operating activities.

The principal cause of failure of disc drives is handling damage, not operational failure (so-called disc crashes). Handling damage to a disc drive occurs as a result of bumping or dropping the disc drive or causing it to come in contact with a hard surface. Such handling damage is classified as disc slip, head slaps, or gross cosmetic damage. Handling damage occurs during freight transit, carton handling, actual product handling, and product-system integration.

Generally similar damage occurs in the case of other information-storage devices, such as tape drives and optical drives. Additional non-operational damage to disc drives and similar devices occurs as a result of electrostatic discharge, and it is typical to ship devices in an anti-static (static-shielded) bag (also known as an ESD bag) to prevent or reduce such damage.

Current non-operational shock specifications for Seagate desktop information storage devices call for ability to survive 300 g at 2 ms. For high-end products, the specification is approximately 150 g at 2 ms. At shock levels in excess of the specification, it is considered that a drive will suffer physical damage. Handling actions such as those described above (e.g., freight transit) often impart shock in excess of the g levels specified above, leading to return of damaged products for repair or replacement under product warranties, at manufacturer expense. It is believed that this problem and the expense due to handling damage has existed for many years in the disc drive industry.

OBJECTS AND SUMMARY OF THE INVENTION

It is an object of the invention to reduce handling damage and the expense resulting therefrom by improving anti-shock protection for disc drives and other information-storage products.

It is an object of the invention to provide a package containing a disc drive or other information-storage device with a means for protecting the disc drive or other information-storage device from impact. More specifically, it is an object of the invention to provide a package containing a disc drive or other information-storage device with a protection means whereby the package can be subjected to substantially higher than 400 g (for example, 1000 g or more) at 2 ms shock levels while the disc drive or other information-storage device within the package receives less than 400 g at 2 ms shock levels, and preferably less than 200 g, thereby reducing the force of an externally delivered impact of at least 1000 g by a factor of at least 2.5 and preferably at least 5.

It is a further object of the invention to provide anti-static protection that will eliminate need for use of an anti-static (static-shielded) bag for the disc drive or other information-storage device within the package. Preferably the anti-static protection should extend to 20 kV.

The present invention provides a means for packaging disc drives and other information-storage devices in a manner that reduces transmittal of shock to the packaged device. The device is placed in a static-dissipative, plastic, "clamshell" protective package comprising an upper and lower portion, each of which has resilient external protrusions that deform under impact to absorb shock. The protective package is preferably a unitary article molded from static-dissipative plastic sheeting, with the upper and lower portions joined at an accordion-like hinge. The upper and lower portions nest together at their peripheral edges, providing a labyrinthine path (in effect, a seal) that prevents passage of contaminants. Shock transmittal (relative to an unprotected drive) is reduced, for example, from a physical impact of 1000 g or more to less than 400 g, and preferably from 1000 g or more to 200 g or less.

DETAILED DESCRIPTION OF THE INVENTION

First Preferred Embodiment

The invention can be appreciated by considering the design of a Seagate commercial Seashell™ package for a disc drive, which represents a first preferred embodiment of the invention.

Molded Clamshell Package

Figure 1:
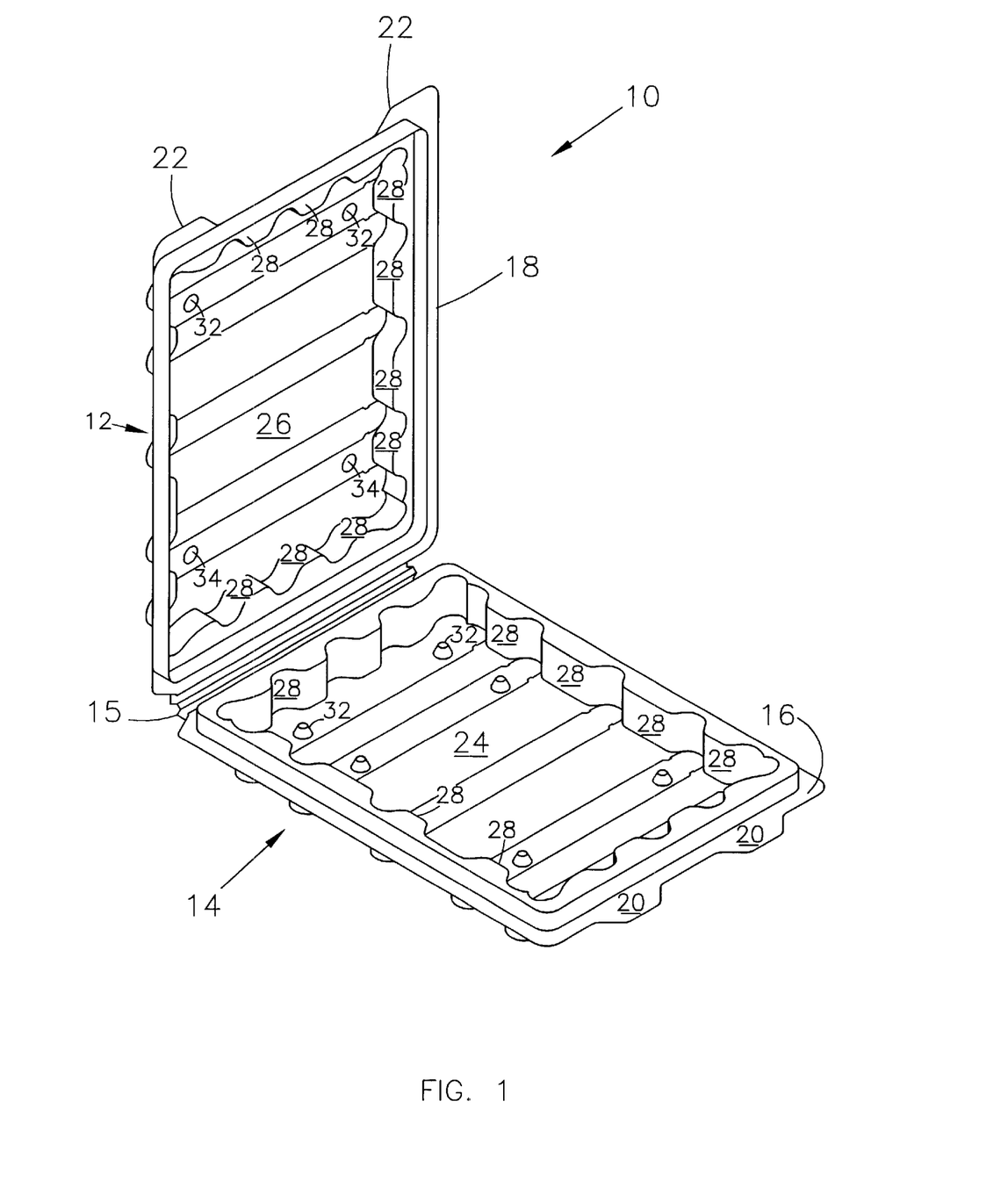
FIG. 1 is a perspective drawing of an opened package of a first embodiment of the invention, from a vantage point above the left proximal end of the lower portion of the package.

Referring to FIG. 1, a perspective drawing of the opened package of the invention from a vantage point above the left proximal end of the lower portion of the package, it is seen that clamshell package 10 comprises an upper molded-sheet portion 12 and a lower molded-sheet portion 14. Upper and lower molded-sheet portions 12 and 14 are joined at their distal ends by an accordion hinge 15. Hinge 15 is shown more advantageously in FIGS. 9–10, in cross-section.

Upper and lower molded-sheet portions 12 and 14 are generally congruent to one another, in the sense that their dimensions are approximately the same and they fit together in approximate mirror image form. However, as will appear, structural differences between upper and lower molded-sheet portions 12 and 14 (in particular, how they interlock) make them not true mirror images of one another and not filly congruent.

In the first commercial Seashell™ embodiment of the invention, the package is a unitary, one-piece article, which is integrally formed by vacuum molding a plastic sheet. This thermoforming process is considered preferable from a manufacturing cost stand-point. However, the package may be manufactured as a two-piece article also, with or without a hinge. For example, if the package is manufactured as a two-piece article without a hinge, upper and lower molded-sheet portions 12 and 14 may be taped together. However, this latter is considered a non-preferred embodiment, since it calls for using two molds and increases parts count as well as requiring a tape (hinge) application step.

Clamshell package 10 of this first embodiment of the invention was manufactured by vacuum molding approximately 0.020 to 0.024 inch thick polyvinyl chloride (PVC) sheet material. (Different exemplars were produced at various such thicknesses. The 0.20 thickness is considered to be preferred.) The material used for this embodiment was Penta-stat™ PVC manufactured by Klockner. This material is static-dissipative, which permits avoiding the cost of an ESD bag that would otherwise be needed. The vacuum molding process was entirely conventional and involved use of techniques well known to persons of skill in the art. Other plastic materials besides PVC were tried, but packages made from PVC provided the best shock resistance of the materials tested.

Flanges and Seals

Figure 2:
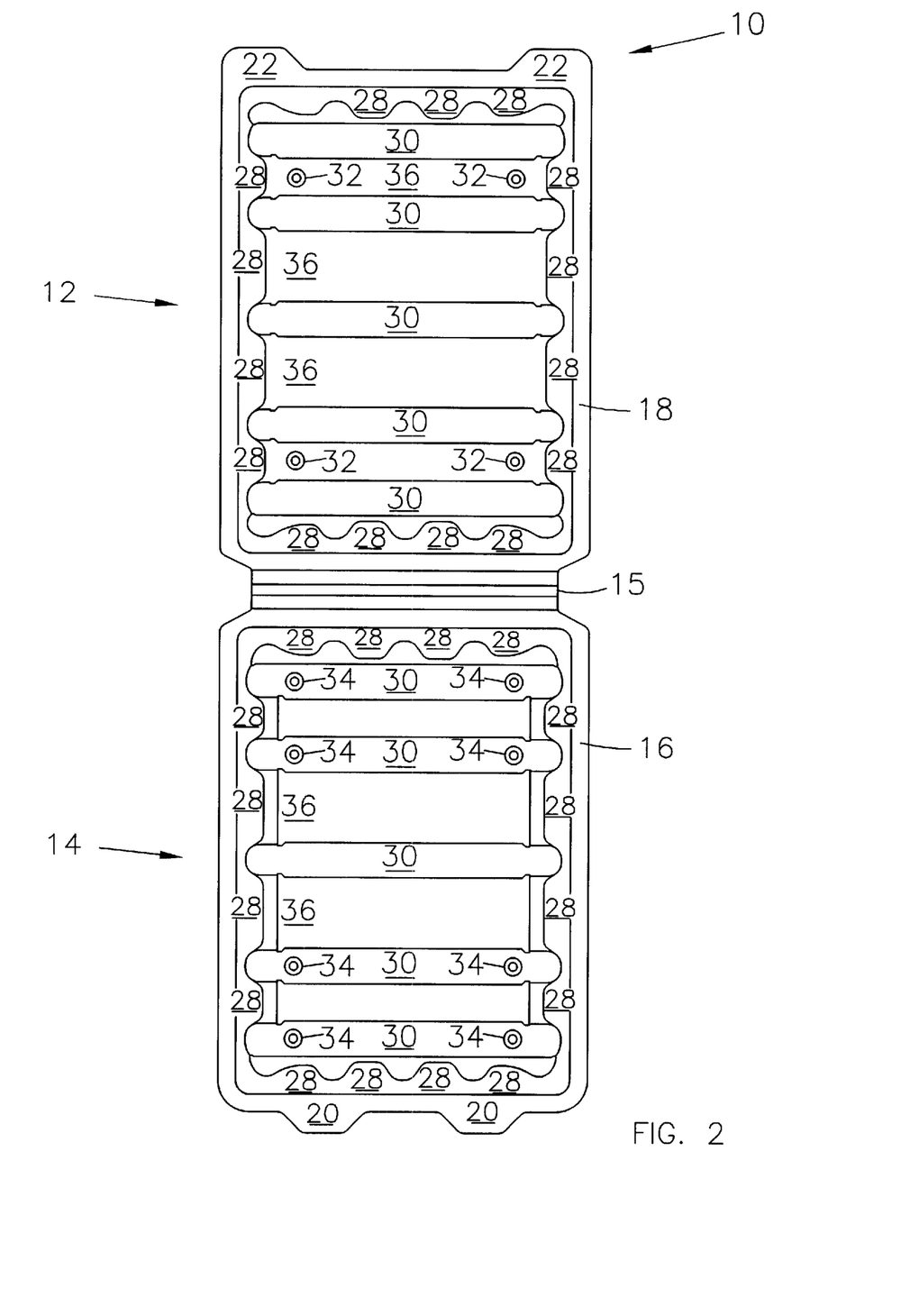
FIG. 2 is a plan view looking down at an opened package of the same first embodiment of the invention, with the lower proximal end of the package lowermost and the upper proximal end uppermost.

Referring now to FIG. 2, a plan view showing the inside of the package as the package appears when it leaves the vacuum mold, it is seen that a lower molded-sheet portion flange member 16 extends generally laterally all around lower molded-sheet portion 14 of package 10. Similarly, an upper molded-sheet portion flange member 18 extends generally laterally all around upper molded-sheet portion 12 of package 10. Each flange member has a stepped structure, shown advantageously in FIGS. 9–10, so that flange member 16 has an inner lateral portion 16a, an intermediate vertical portion 16b, and an outer lateral portion 16c, while flange member 18 has an inner lateral portion 18a, an intermediate vertical portion 18b, and an outer lateral portion 18c. Lower molded-sheet portion flange 16 has two tabs 20 extending proximally therefrom at the proximal end of the package. Upper molded-sheet portion flange 18 has two tabs 22 extending proximally therefrom at the proximal end of the package. When package 10 is closed, tabs 20 engage against tabs 22 with an overlap, as shown advantageously in FIG. 3, a plan view of the closed package. Tabs 20 and 22 cooperate to facilitate opening the package when it is closed; the user simultaneously pushes tab(s) 20 down and 22 up to separate the upper and lower molded-sheet portions of the package at the proximal end.

In the first commercial Seashell™ embodiment of the invention, the package is approximately 5.25 inches wide, 7.5 inches long (including tabs), and 1.5 inches high (including ribs). The outer lateral flange members extend laterally outward approximately 0.25 inches, and the tabs extend another approximately 0.25 inches longitudinally outward. This package accommodates a disc drive (or other information-storage device) approximately 4 inches wide, 5.75 inches long, and 1.25 inches high.

Figure 10:
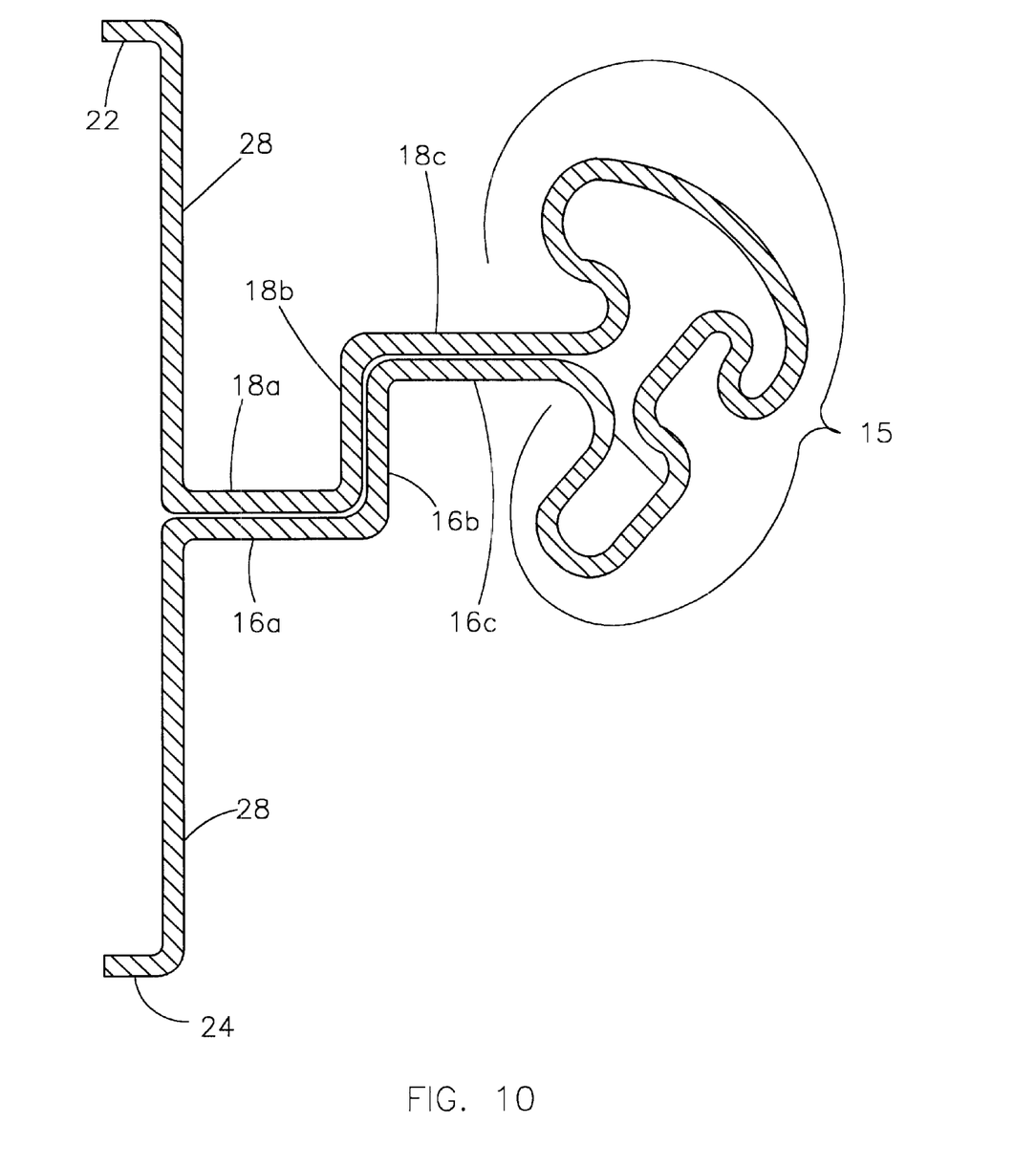
FIG. 10 is also a side view cross-sectional detail of the hinge located at the distal end of the package, showing adjacent portions of the package. In this view the upper portion of the package has been rotated to the left (counterclockwise), relative to FIG. 9, showing the package closed and the flange member of the upper portion of the package nested into the flange member of the lower portion of the package.
Figure 11:
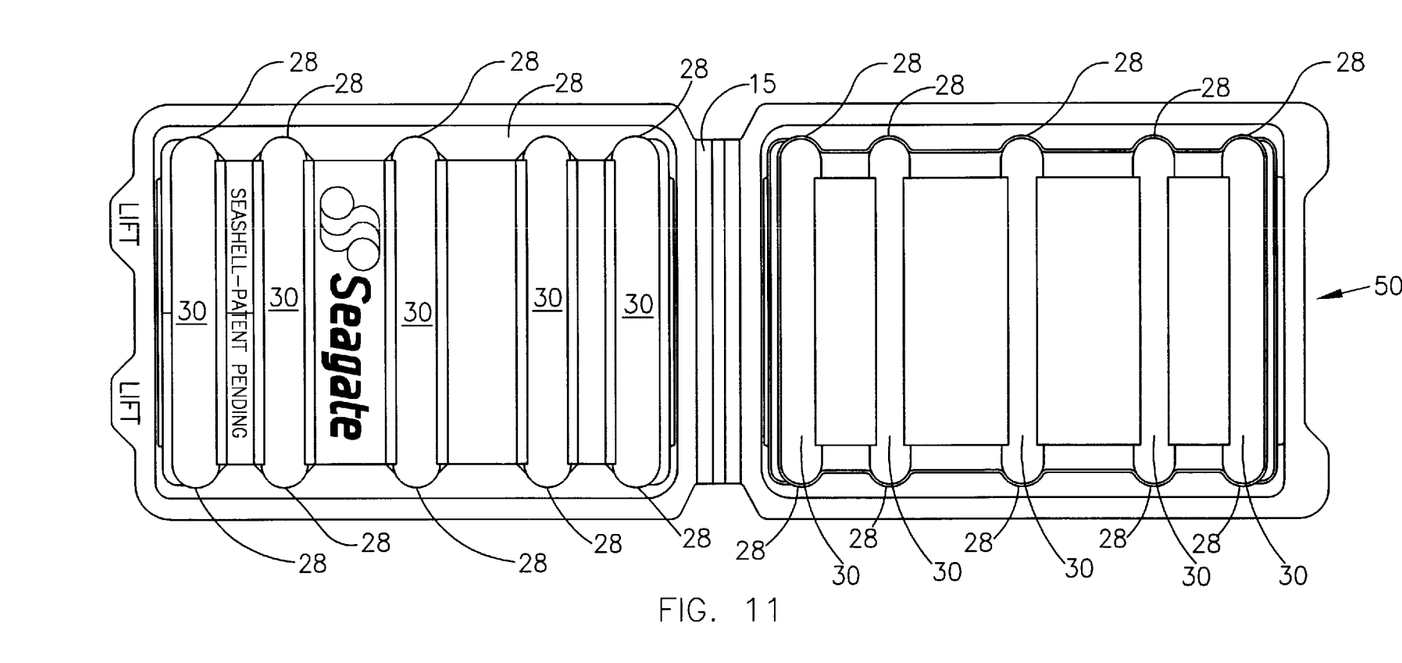
FIG. 11 is a plan view of an opened package of a second embodiment of the invention, from a vantage point above the package.
Figure 12:
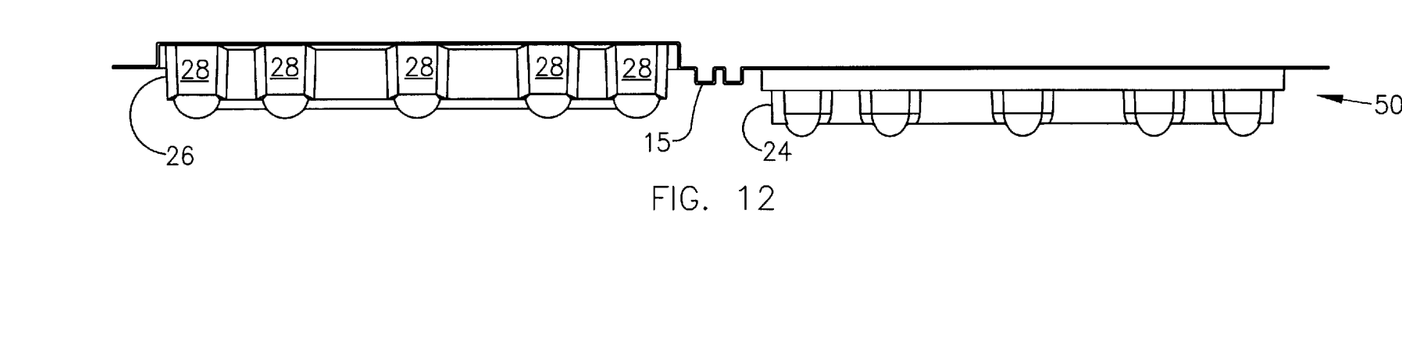
FIG. 12 is a side view of the same opened package of a second embodiment of the invention.
Figure 13:
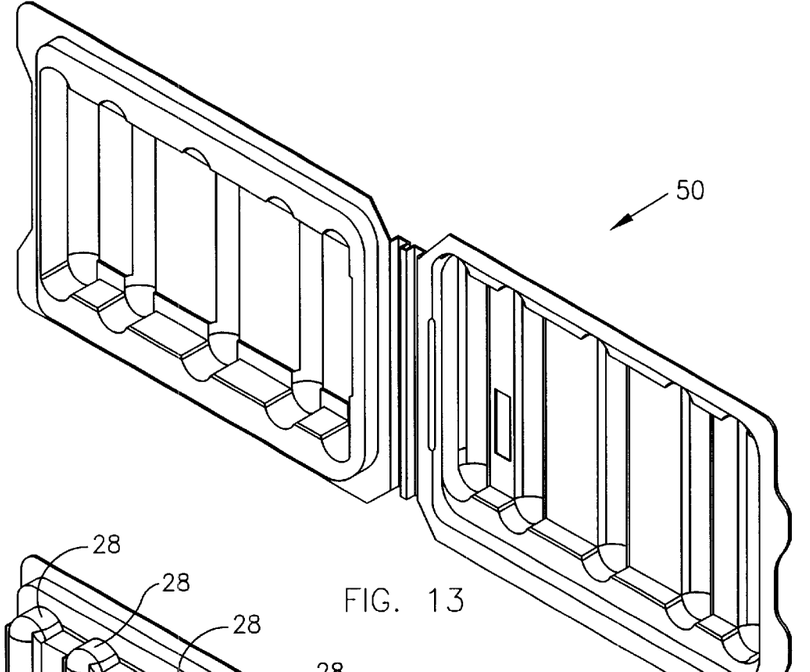
FIG. 13 is a perspective view of the same opened package of a second embodiment of the invention, viewing the interior of the package.
Figure 14:
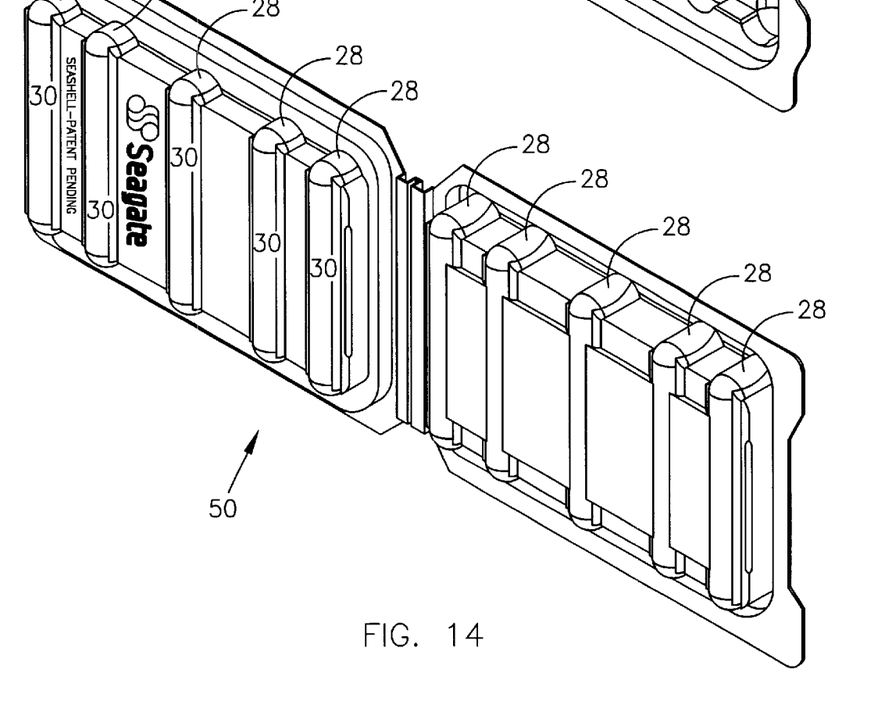
FIG. 14 is a perspective view of the same opened package of a second embodiment of the invention, viewing the exterior of the package.
Figure 15:
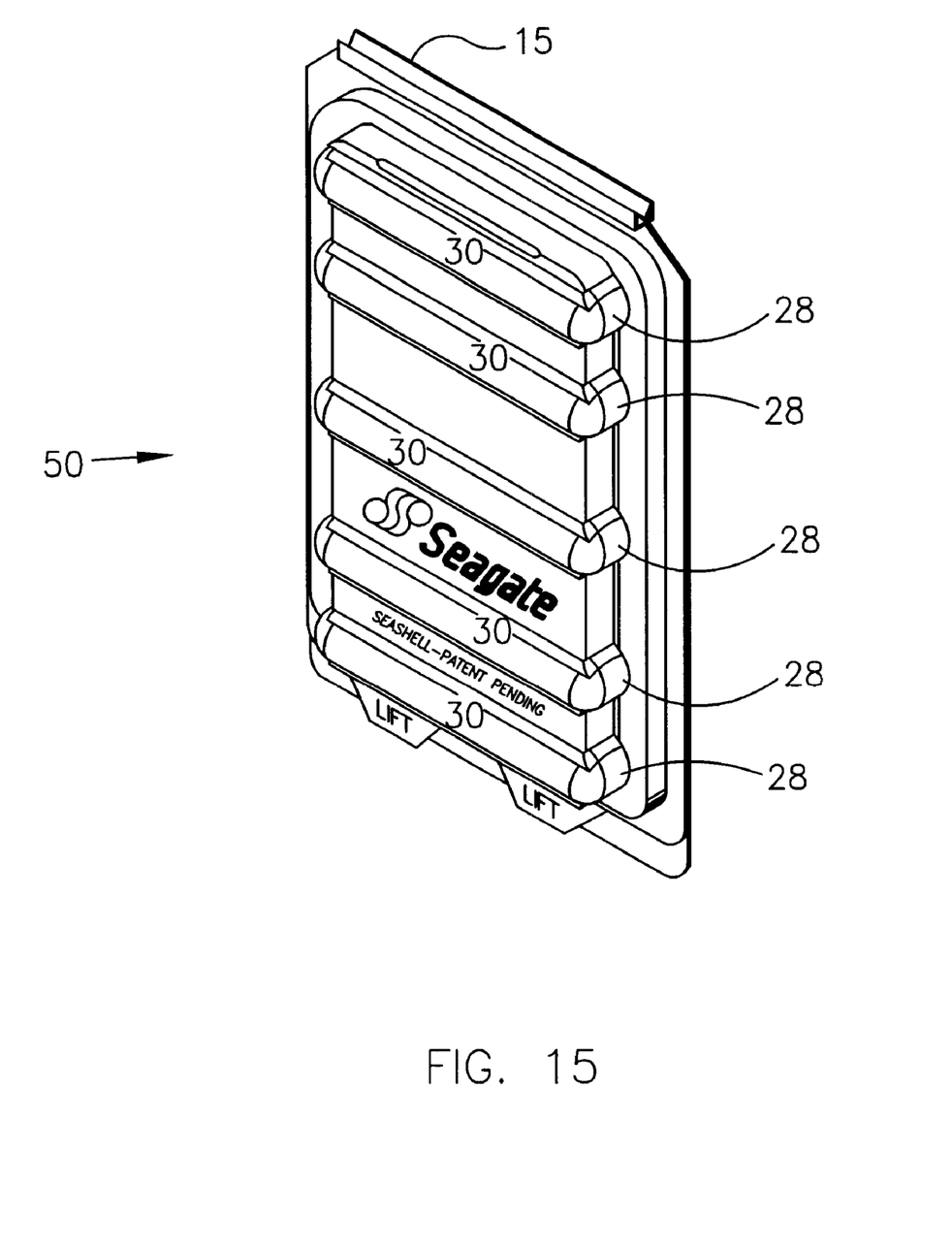
FIG. 15 is a perspective view of a closed package of a second embodiment of the invention, viewing the package from above.

Returning to FIG. 1, it is seen that lower molded-sheet portion flange member 16 leads via the above-described stepped structure to lower dome 24, which is a half disc drive height recess in the package. Upper molded-sheet portion flange member 18 leads to a complementary stepped structure for upper dome 26, which is also a half disc drive height recess in the package. Accordingly, a labyrinthine path, shown more advantageously in FIG. 10, is provided to block ingress of contaminants from outside the package to the disc drive to be stored within domes 24 and 26 (and it also blocks escape of fluids, if any, from the drive stored in the domes). At the same time, a structure is provided by which the upper dome fits with the lower dome tightly and keeps the package closed with a so-called male-to-female fit of the flange members.

Figure 9:
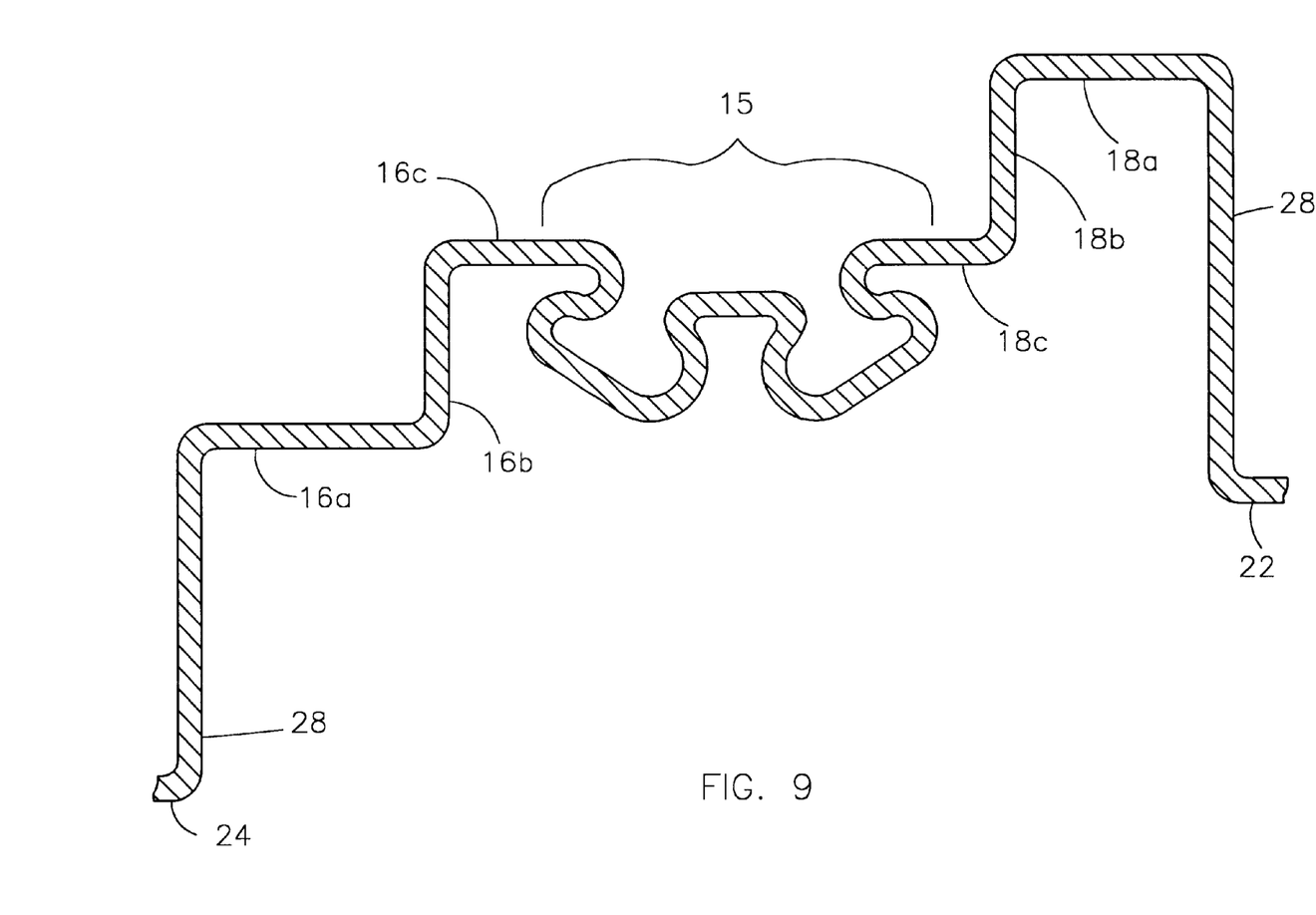
FIG. 9 is a side view cross-sectional detail of the hinge located at the distal end of the package, showing adjacent portions of the package, with the upper portion of the package to the right and the lower portion to the left. The package is fully open in this view, with the upper and lower portions 180 degrees apart.

The flange member structure "leans" slightly inward at the upper part of the steps, so that when the upper and lower molded-sheet portions are pressed together a deformation and detent effect occurs, holding the closed package together. The operation of this structure is further described below in connection with hinge 15, and FIGS. 9–10 show hinge 15 and the flange members in cross-section. As shown in FIG. 10, when package 10 is closed the upper extremities of intermediate vertical portions 16b and 18b are slightly to the left of the lower extremities thereof, causing a tight fit and a detent effect tending to maintain closure. A similar cross-section for the flange members obtains all around the rest of the periphery of the package, although without any hinge 15 as shown in FIG. 10. Thus, for material (e.g., dirt) to enter or exit the closed package the material would need to traverse the labyrinthine path defined by elements 16c/18c, 16b/18b, and 16a/18a of flange members 16 and 18.

While the labyrinthine path shown here is, in effect, merely a partly straightened-out Z, other non-straight-line and/or more complex paths may be used to exclude contaminants, such as a Z (not straightened out), W, M, or Ω, so long as the path is effective to exclude undesirable material and yet permissive of closure and opening of the package.

Domes

Domes 24 and 26 are generally (but not fully) both congruent and mirror images. Both domes have approximately the same dimensions and they fit together in complementary fashion along the flange members, so as to define a compartment in which to place the disc drive or other storage device being packaged. Both domes are characterized by vertical dome walls in part having an undulating, sine-wave-like cross-section. These are resilient and deformable structures referred to hereinafter as buttresses 28. In addition, both domes have resilient and deformable structures 30 formed therein, which extend across the dome roofs and protrude vertically outward therefrom. These protrusions are referred to hereinafter as ribs. These ribs, like the buttresses, provide a means for protecting the disc drive or other information-storage device enclosed within the package from physical impact. As will appear, these curved resilient protrusions on the dome deform under impact and thereby reduce a force directed against the package to a much smaller force sensed at the enclosed device (for example, reducing 1000 g to 200–400 g or less).

Ribs

Figure 4:
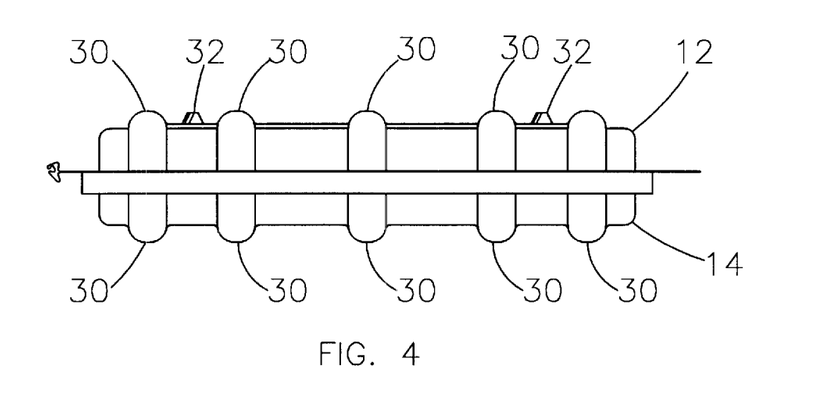
FIG. 4 is a side view of the closed package with the proximal end to the right.
Figure 5:
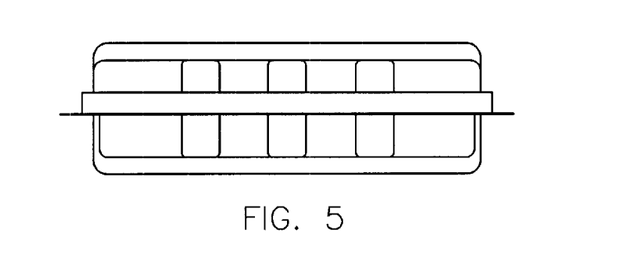
FIG. 5 is an end view of the distal end of the closed package.
Figure 6:
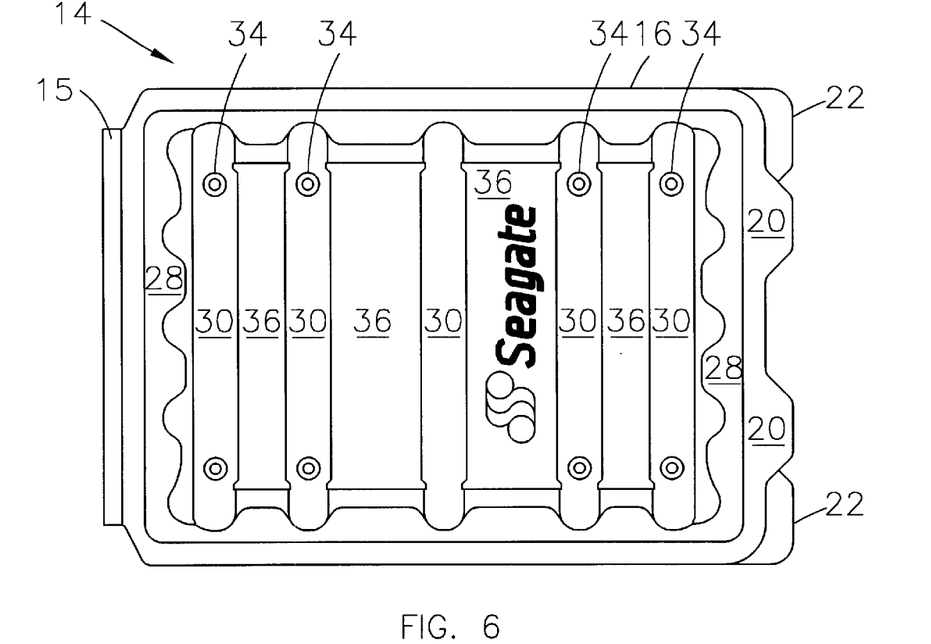
FIG. 6 is a plan view looking down at the lower portion of the closed package with the proximal end of the package to the right.
Figure 7:
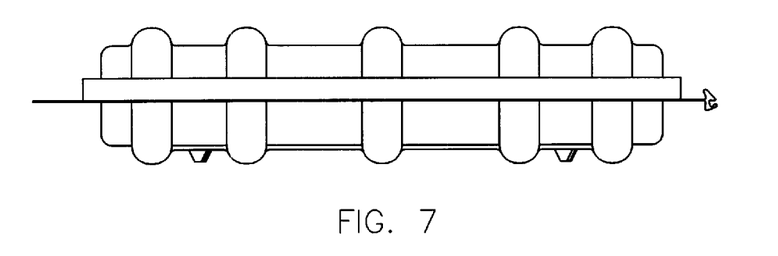
FIG. 7 is a side view of the closed package with the proximal end to the left.
Figure 8:
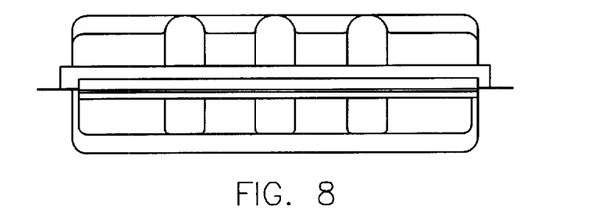
FIG. 8 is an end view of the proximal end of the closed package.

Turning first to the ribs, by referring to FIG. 4 it is seen that a plurality of rounded ribs 30 extend out from upper and lower molded-sheet portions 12 and 14 of the package, and more specifically from domes 24 and 26.

It is desirable that the ribs extend all of the way across the domes, to provide maximum protection against impact. However, they should not extend transversely so far that they interfere with the effect of the labyrinthine path of the flange members. If they did so, then the outwardly projecting buttress vertical extension of the ribs could open up a path around the seal that the flange members provide against passage of contaminants. It is considered that approximately 0.1 inch clearance between the end of the ribs/buttresses and the vertical portion of the flange (i.e., elements 16*b* and 18*b*) is appropriate for this purpose. Such a clearance can be observed advantageously in FIG. 1, where it is seen that the vertical buttress walls do not extend all of the way to the intermediate vertical portions of the flanges (elements 16*b* and 18*b*).

Figure 3:
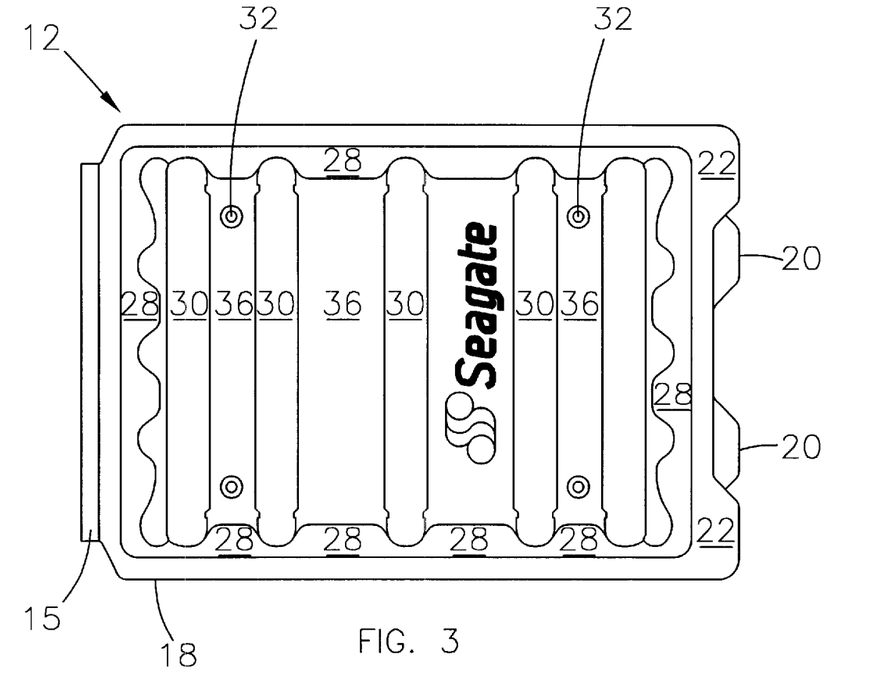
FIG. 3 is a plan view looking down at the upper portion of a closed package of the same first embodiment with the proximal end of the package to the right.

Rounded ribs 30 are resilient and deform inward upon impact. Therefore they absorb shock, thereby protecting the disc drive stored within the package. In the first commercial embodiment of the Seashell™ package, it was found that five upper ribs and five lower ribs, transversely disposed on domes 24 and 26, respectively, as shown in FIGS. 3–4 (and described in the succeeding paragraph), performed satisfactorily to meet desired shock resistance specifications.

In the first commercial Seashell™ embodiment, the ribs are semicircular in cross-section, approximately 0.5 inches in diameter, and project outward from the dome approximately 0.25 inches. There are five ribs transversely disposed on each of the roof domes, extending transversely the entire width of the roof and to approximately 0.1 inches of the intermediate vertical flange portions. The longitudinally proximal edge of the first (i.e., most proximal) rib approximately coincides with the proximal end of the compartment defined by the proximal inwardly projecting buttresses. Likewise, the longitudinally distal edge of the fifth (i.e., most distal) rib approximately coincides with the distal end of the space or compartment defined by the distal inwardly projecting buttresses. The third (central) rib is approximately longitudinally equidistant from the proximal and distal ends of the same compartment. The remaining (second and fourth) ribs are symmetrically disposed slightly more toward the ends of the roof than toward its center, so that the respective distances between the central longitudinal (transversely extending) axes of the first, second, and third ribs are approximately 1 inch and 1.5 inches.

In another, less preferred embodiment, the dimensions of the package were similar, except that the five ribs transversely disposed on each of the roof domes, extending transversely the entire width of the roof and to approximately 0.1 inches of the intermediate vertical flange portions, were spaced such that the two ribs flanking the centermost rib had their longitudinal axes separated approximately 1 inch from the longitudinal axis of the centermost rib, and such axes were separated from the axes of the most distal and most proximal ribs, respectively, by approximately 1.5 inches. In still another, less preferred embodiment, the dimensions of the package were similar, except that the five ribs transversely disposed on each of the roof domes were spaced approximately equidistant from one another (each longitudinal axis approximately 1.25 inches apart from the next longitudinal axis).

In designing the package, the size and shape of the ribs were varied to optimize impact resistance. The number of ribs, the orientation of the ribs, and their radius were varied in different combinations during the design process. Also, other shapes besides semi-cylindrical ribs were tried, including stepped or terraced ("ziggurat") structures and arrays of buttons or hemispheres. Of course, not every conceivable shape and combination of deformable protrusions was tested. Of the specific configurations tested, the five-rib structure appeared to provide the best performance.

It appears that the optimum arrangement of these protrusions must be determined empirically on a case-by-case, trial-and-error basis. It has not been possible thus far to develop a rationale for determining best arrangement for these resilient protrusions, and therefore no substitute has yet been found for a primarily empirical approach. It does appear, however, that more than one satisfactory arrangement can be devised that will perform within shock specifications, so that to some extent it is a matter of design choice or aesthetics what specific arrangement of resilient or deformable protrusion to use.

The ribs or the flat areas on the domes between ribs optionally contain small cone-like projections or complementary recesses, to facilitate stacking the packages. Flat areas between ribs may advantageously be used to contain logos, brand names, etc.

Buttresses

As indicated, disposed on the parts of the vertical dome walls around the periphery of upper and lower domes 24 and 26 are rounded, buttress-like structures 28, which are adapted to cushion and snugly contain the disc drive within the domes. These rounded buttress-like structures are resilient and thus act as springs to absorb shock and cushion the disc drive, and they prevent the disc drive from rattling around in the package when the package is subjected to impact from the ends or sides of the package. Preferably, buttresses 28 press against the disc drive to hold it firmly in place at all times by a snug fit. Each dome's buttresses preferably extend vertically half the height of the disc drive, if the two domes have equal heights, such that the dome roofs are distanced by approximately the height of the disc drive.

The inwardly extending lateral extremities of the buttresses define a compartment within the domes, whose width and height dimensions correspond to the width and height of the disc drive to be stored in the package. The number of buttresses extending inward should be at least two per side, since two points (here, points of tangency) define a line in a Euclidean plane. Other than that, the number and location of the buttresses is a matter of design choice and of aesthetic considerations.

Inn the first commercial embodiment, five buttresses extend laterally outward from each side of each dome, and coincide with the ribs; that is, they act as vertical extensions of the ribs between the dome roofs and the flanges. The five outwardly extending side buttresses alternate with four side buttresses extending laterally inward. Each end of a dome also has five buttresses extending outward and four buttresses therebetween extending inward.

Preferably, the buttresses are structured in a generally sine-wave-like shape, so that their portions not projecting convexly outward away from the domes project convexly inward into the domes. Thus, the buttress formations of the domes both project inward to cushion the disc drive within the domes at one part of the "sine wave" and they project somewhat into the flanges' inner lateral portion a half cycle farther along the "sine wave." (In a variation of this design, only the most distal and most proximal inwardly extending buttresses on the sides of the domes curve in towards the enclosed disc drive or other information-storage device, and the remaining centrally located side buttresses present a flat longitudinal surface toward the enclosed device. In a second commercial embodiment, discussed hereinafter, all four of the structures between outwardly extending buttresses present a flat longitudinal surface toward the enclosed device.)

At the right and left sides of the domes, the buttress formations 28 interact with ribs 30. The inwardly projecting parts of the buttresses are located between ribs. The outwardly projecting parts of the buttresses preferably coincide in shape and location with the ribs and thus, as indicated above, they vertically extend the rounded projections of the ribs from the dome roof to the flange members. Hence, when the package lands on a side at an angle the outwardly projecting parts of the buttresses deform to provide some cushioning and to absorb the impact, in such a manner as the ribs do.

In addition, tabs 20 and 22, as well as hinge 15, are resilient and thus capable of further absorbing impact directed at the ends of the package.

Hinge

Referring to FIGS. 9–10, which show cross-sectional views of the hinging along a longitudinal vertical section of the package, it is seen that hinge 15 is an accordion-like or pleated structure. As shown in FIG. 9, hinge 15 is located between the distal ends of the package portions, connecting the distal ends of flanges 16 and 18.

In the fully closed position of clamshell package 10, upper and lower molded-sheet portions 12 and 14 are in registration with one another; the domes and buttresses of each portion are vertically aligned; and the step structure of the upper flange member is nested into the step structure of the lower flange member. Thus, element 18c is directly over and in registration with element 16c. Element 18b vertically parallels and engages element 16b and is surrounded thereby. Element 18a is directly over and in registration with element 16a. Hinge 15 is folded up in a manner permitting this configuration of the upper and lower molded-sheet potions.

In the fully open position of clamshell package 10, with the upper and lower molded-sheet potions extending in 180 degree opposite directions, element 18c, the outer lateral portion of flange member 18 of upper molded-sheet portion 12, is at approximately the same height as element 16c, the outer lateral portion of flange member 16 of lower molded-sheet portion 14. At the same time, element 18a, the inner lateral portion of flange member 18 of upper molded-sheet portion 12, is raised substantially above the elements of lower molded-sheet portion 14. Hinge 15 is opened up to a maximum extent.

Shock Tests

The foregoing package of the invention was compared with other packages in regard to shock resistance, using a non-operating Seagate model No. ST31024A disc drive, accelerometer-equipped on appropriate axes for measurement of g's. An unprotected drive dropped 12 inches to a hard surface received shock in excess of 1060 g, while a Seashell™-packaged drive registered less than 140 g for the same 12 inch drop. The unprotected drive subjected to a 120 degree topple sustained in excess of 1100 g while the Seashell™-packaged drive registered less than 200 g. A 20 kV "zap" test indicated that the Seashell™-packaged drive met current anti-static specifications as well as a drive in an ESD bag did. Other tests indicated that a Seashell™-packaged drive registered less than 200 g for 1.5 foot drops onto a thin ESD mat and 2 foot drops onto cardboard. The Seashell™ package also met test specifications for exit and entry of contaminants.

Second Preferred Embodiment

A second commercial embodiment of the SeaShell package has been developed. This second preferred embodiment, shown in FIGS. 11–15 as package 50, eliminates buttresses 28 of FIGS. 1–8 at the distal and proximal ends of the package. This is done in order to shorten the dimensions of the package from those of package 10 to those of package 50, and thus permit more packages of disc drives to be loaded on a pallet when shipping the disc drives. This embodiment also uses a different static-dissipative plastic material which has been found to be more effective.

As shown in FIGS. 11–15, this package 50 resembles package 10 of the first commercial embodiment, but it is not as long from the distal end to the proximal end. The distal and proximal end walls of domes 24 and 26 of package 50 are straight (without buttresses 28), and are located only approximately 0.1 inch beyond the edge of the outermost of ribs 30. This design change reduces the total external length of package 50, including the tabs and hinge, to approximately 7 inches, as contrasted with approximately 7.5 inches in the first commercial embodiment, package 10. This difference permits a significant reduction in disc drive shipping costs. The compartment inside the domes of package 50 has the same size as in package 10, so that both packages accommodate the same size of device. The plastic sheeting from which package 50 is molded is 0.20 inch static-dissipative PVC, sold by Klockner as ASKPET/56.

In other design respects, package 50 is substantially like package 10, described earlier. Like package 10, package 50 utilizes ribs 30, and outward-extending buttress extensions 28 of the ribs at the sides of the package, as a means for protecting the enclosed device from impact. The ribs and buttresses are arrayed in rows or columns along the domes. These curved resilient protrusions elastically deform under impact to absorb impact energy and thereby reduce the force sensed at the enclosed disc drive to a fraction of the force externally delivered to the package. Thus, the package can be subjected to substantially higher than 400 g (for example, 1000 g or more) at 2 ms shock levels while the disc drive or other information-storage device within the package receives less than 400 g at 2 ms shock levels, and preferably less than 200 g. The static-dissipative material of the package also protects the enclosed device from at least 20 kV. The package of the second embodiment tested for impact and electrostatic shock equally as well or better than the first embodiment.

Method of Operation

While the foregoing discussion has been directed to the package aspect of the invention, the inventors consider that the invention also includes the use of the package for its intended purpose, i.e., as a means for protecting disc drives and other information-storage devices from impact and electrostatic shock. Accordingly, it is considered that the scope of the invention includes a method for protecting a disc drive from electrostatic shock and physical impacts.

The method involves providing a protective package according to the invention and then enclosing the disc drive or other information-storage device within the package. The protective package of the invention, as described earlier, is a two-dome clamshell package that has been molded from a sheet of static-dissipative, resilient plastic material and that has been adapted to enclose the disc drive or other information-storage device, where the domes have formed in them a means for protecting the enclosed device from impact. The means for protecting the enclosed device from impact is the array of resilient curved protrusions protruding from the domes, which has been discussed above. As previously indicated, the protrusions deform under impact, absorbing the energy of the impact, so that an external force of 1000 g or more is reduced below 400 g as sensed at the enclosed device, and preferably is reduced below 200 g. The static-dissipative material of the package protects the enclosed device from at least 20 kV.

It is considered also that the invention disclosed hereinabove extends to a process for manufacturing the protective package of the invention. As indicated, the process involves thermoforming a sheet of static-dissipative, resilient plastic material in a vacuum mold to make a two-dome clamshell package that has resilient curved protrusions protruding from the domes, as described above. The molding process is otherwise conventional, but it results in the novel product of the invention, which embodies in the package the invention's novel means for protecting a disc drive or other information-storage device from physical impact and electrostatic discharge, as described above.

CONCLUDING REMARKS

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made.

It should be appreciated that the scope of this invention is not limited to the detailed description of the invention hereinabove, which is intended merely to be illustrative, but rather comprehends the subject matter defined by the following claims.

That which is claimed is:

1. A package comprising:
    an first dome;
    a second dome mateable with the first dome to define an inner recess adapted to snugly enclose an information storage device, the first dome and the second dome being molded from static-dissipative material; and
    walls which support a roof which comprises each one of the first and the second dome, in which substantial portion of at least two of the walls includes a plurality of resilient protrusion into the inner recess.

2. The package of claim 1 in which the static-dissipative material is adapted to protect an enclosed information storage device from an electrostatic charge of at least 20 kV.

3. The package of claim 1 in which each one of the first dome and the second dome is molded from plastic sheet material of about 0.02 inch.

4. The package of claim 1 in which a substantial portion of the roof of each one of the first dome and the second dome includes a plurality of resilient protrusions.

5. The package of claim 4 in which the protrusions are adapted to reduce an externally delivered impact to no more than 300 g at 2 ms as sensed at an enclosed information storage device.

6. The package of claim 4 further comprising at least one resilient protrusion at an edge here the roof and at least one of the walls meet, where at least one of the resilient wall protrusions is offset from at least one of the resilient roof protrusions where the roof and at least one of the walls meet.

7. The package of claim 1 further comprising a hinge coupling the first dome with the second dome.

8. A product comprising:
    a package of claim 1; an
    an information storage device enclosed in the package.

9. A method for protecting an information-storage device from electrostatic discharge and physical impact, the method comprising steps of:
    (a) providing a package of claim 1;
    (b) placing the information-storage device within the package; and
    (c) closing the package around the information-storage device.

10. The package of claim 1 in which the protrusions are adapted to absorb an externally delivered impact.

11. A package comprising:
    a first dome;
    a second dome mateable with the first dome to define an inner recess adapted to snugly enclose an information storage device, the first dome and the second dome being molded from static-dissipative material, each dome comprising a roof supported by walls, where a substantial portion of the roof includes a plurality of resilient protrusions.

12. The package of claim 11, a plurality of the protrusions having a generally semi-circular cross-section.

13. The package of claim 11, a plurality of the protrusions spaced from one other in a manner such that they form columns or rows on a surface of a dome of the package.

14. The package of claim 11, a plurality of the protrusions protruding convex-outward from a surface of a dome of the package.

15. The package of claim 11, a plurality of the protrusions generally semi-cylindrical members disposed on a surface of a dome of the package.

16. The package of claim 1, a plurality of the generally semi-cylindrical members extending substantially across the roof.

17. The package of claim 1, a plurality of the generally semi-cylindrical members extending entirely across the roof from a right side of the roof to a left side of the roof.

18. The package of claim 1, further comprising a right wall, a left wall, a proximal end wall, a distal end wall and a roof which comprises each one of the first an second domes.

19. The package of claim 18 in which a substantial portion of at least two of the walls includes a plurality of protrusions into the inner recess.

* * * * *